(12) United States Patent
Yoshida

(10) Patent No.: US 7,202,709 B2
(45) Date of Patent: Apr. 10, 2007

(54) WAVEFORM OUTPUT DEVICE AND DRIVE DEVICE

(75) Inventor: Mitsunobu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 11/088,894

(22) Filed: Mar. 25, 2005

(65) Prior Publication Data

US 2005/0218940 A1 Oct. 6, 2005

(30) Foreign Application Priority Data

Mar. 31, 2004 (JP) ............................. 2004-107338

(51) Int. Cl.
*H03B 21/00* (2006.01)
(52) U.S. Cl. ...................... 327/106; 327/100
(58) Field of Classification Search ............... 327/100, 327/106; 315/268; 340/815.45; 702/189, 702/124; 714/718
See application file for complete search history.

(56) References Cited

U.S. PATENT DOCUMENTS

| | | | |
|---|---|---|---|
| 4,497,056 A * | 1/1985 | Sugamori | 714/736 |
| 6,219,356 B1 * | 4/2001 | Beukema | 370/516 |
| 6,611,079 B2 | 8/2003 | Koga et al. | 310/309 |
| 6,781,281 B2 | 8/2004 | Koga et al. | 310/309 |
| 2002/0101769 A1 | 8/2002 | Garverick et al. | 365/200 |
| 2003/0189390 A1 | 10/2003 | Koga et al. | 310/309 |
| 2004/0119870 A1 | 6/2004 | Yoshida et al. | 348/335 |
| 2004/0130802 A1 | 7/2004 | Koga et al. | 359/694 |

FOREIGN PATENT DOCUMENTS

JP 3-253296 11/1991
JP 8-140367 5/1996

OTHER PUBLICATIONS

U.S. Appl. No. 10/950,449, filed Sep. 28, 2004, Yoshida.
U.S. Appl. No. 10/950,421, filed Sep. 28, 2004, Yoshida.
U.S. Appl. No. 10/299,662, filed Nov. 20, 2002, Koga et al.
U.S. Appl. No. 11/088,894, filed Mar. 25, 2005, Yoshida.
U.S. Appl. No. 11/090,153, filed Mar. 28, 2005, Yoshida.
Z. Otten, "I$^2$C stepper motor controller, a unipolar stepper motor under digital control", Elektor Electronics, vol. 25, No. 277, XP-000891198, May 1999, pp. 14-16.
Akihiro Koga, et al., "Electrostatic Linear Microactuator Mechanism for Focusing a CCD Camera", Journal of Lightwave Technology by IEEE, vol. 17, No. 1, Jan. 1999, pp. 43-47.

* cited by examiner

*Primary Examiner*—Linh My Nguyen
(74) *Attorney, Agent, or Firm*—Oblon, Spivak, McClelland, Maier & Neustadt, P.C.

(57) ABSTRACT

A waveform output device includes a data reception unit which receives at least a part of a waveform pattern generation program transmitted from an external device connected to the data reception unit through a data line, the waveform pattern generation program being able to generate output data information and output time information, a tentative storage device which tentatively stores the waveform pattern generation program received from the data reception unit, a data processing unit which processes the waveform pattern generation program in the tentative storage device to generate the output data information and the output time information, and an output waveform generation unit which outputs waveform data to drive an electronic device based on the output data information and the output time information.

14 Claims, 5 Drawing Sheets

WAVEFORM OUTPUT DEVICE AND DRIVE DEVICE

CROSS-REFERENCE TO RELATED APPLICATIONS

This application is based upon and claims the benefit of priority from prior Japanese Patent Application No. 2004-107338, filed Mar. 31, 2004, the entire contents of which are incorporated herein by reference.

BACKGROUND OF THE INVENTION

1. Field of the Invention

The present invention relates to a waveform output device which outputs waveform data in order to control actuators and electronic devices such as LED and a drive device into which the waveform output device is incorporated, particularly to the waveform output device and the drive device in which a module area can be decreased while development cost can be reduced.

2. Description of the Related Art

Figure 6:
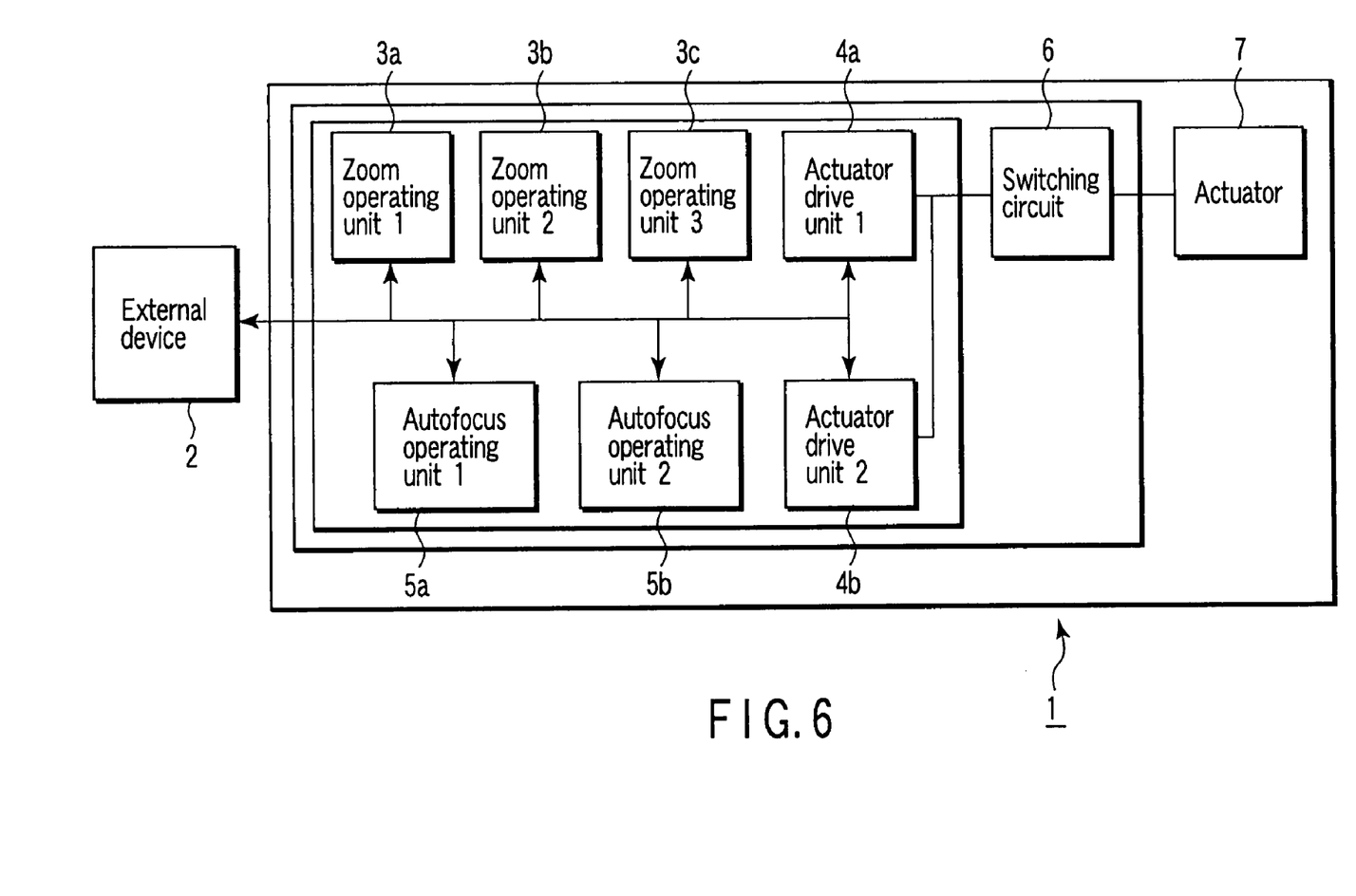
FIG. 6 is a block diagram showing an example of the conventional actuator system.

A control device which controls the actuators such as an electrostatic actuator, a piezoelectric actuator, and a stepping motor and the electronic devices such as LED using the waveform data is well known (Jpn. Pat. Appln. KOKAI Publication No. 8-140367). FIG. 6 is a block diagram showing a configuration of an actuator system 1 which is an example of such control devices. The actuator system 1 includes an external device 2 to which a control signal is inputted, zoom operating units 3a to 3c in which operating sequences are stored, actuator drive units 4a and 4b, autofocus operating units 5a and 5b, a switching circuit 6, and an actuator 7.

In the actuator system 1, the waveform data is outputted from the zoom operating units 3a to 3c in which the predetermined plural operating sequences are stored, the actuator drive units 4a and 4b, and the autofocus operating units 5a and 5b.

Figure 7:
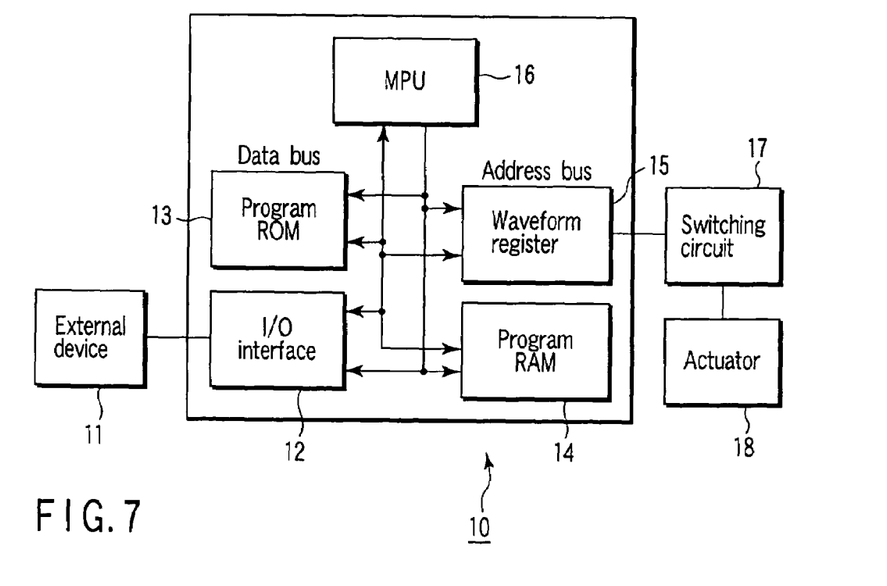
FIG. 7 is a block diagram showing another example of the conventional actuator system.

FIG. 7 is a block diagram showing the configuration of an actuator system which is another example of the control device. The actuator system 10 includes an external device 11 to which the control signal is inputted, an I/O interface 12, a program ROM 13, a program RAM 14, a waveform output register 15, MPU 16, a switching circuit 17, and an actuator 18.

In the actuator system 10, a predetermined waveform pattern is outputted from a waveform pattern output program recorded in the program ROM 13 and MPU 16. Because an unexpected drive waveform cannot be generated only by the program ROM 13, the data is set in the program RAM 14 from the external device 11, and MPU 16 reads the RAM data to generate the waveform pattern.

However, because a nonvolatile memory for storing the drive waveform does not exist, it is difficult to store the unexpected drive waveform. In order to store the unexpected drive waveform, it is thought that the nonvolatile memory is additionally mounted on the actuator module or the nonvolatile memory of the external device is utilized as storage.

In the above waveform output device, there are the following problems. Namely, it is difficult to mount the nonvolatile memory on the actuator module, because cost of the actuator module is increased and a component mounting area is also increased. Because a dedicated communication line for connecting the external device and the actuator module is required in order to utilize the nonvolatile memory of the external device, modification of the external device is required, which results in the problem that development cost is increased. Further, in the case of the configuration in which one external device drives the plural actuators, the dedicated communication line is required for each actuator in the external device, which results in the problem that a wiring area is increased.

BRIEF SUMMARY OF THE INVENTION

In view of the foregoing an object of the invention is to be able to reduce production cost while being able to generate an unexpected drive waveform using a waveform pattern generation program.

In order to solve the above-described problem and achieve the object, according to embodiments of the present invention, there is provided a waveform output device comprising: a data reception unit which receives at least a part of a waveform pattern generation program transmitted from an external device connected to the data reception unit through a data line, the waveform pattern generation program being able to generate output data information and output time information; a tentative storage device which tentatively stores the waveform pattern generation program received from the data reception unit; a data processing unit which processes the waveform pattern generation program in the tentative storage device to generate the output data information and the output time information; and an output waveform generation unit which outputs waveform data to drive an electronic device based on the output data information and the output time information.

Further, according to embodiments of the present invention, there is provided a waveform output device comprising: a data reception unit which receives output data information and output time information transmitted from an external device connected to the data reception unit through a data line, the output data information and the output time information being generated based on a waveform pattern generation program; and an output waveform generation unit which outputs waveform data to drive an electronic device based on the output data information and the output time information.

According to embodiments of the present invention, the production cost can be reduced while the unexpected drive waveform can be generated using the waveform pattern generation program.

DETAILED DESCRIPTION OF THE INVENTION

Figure 1:
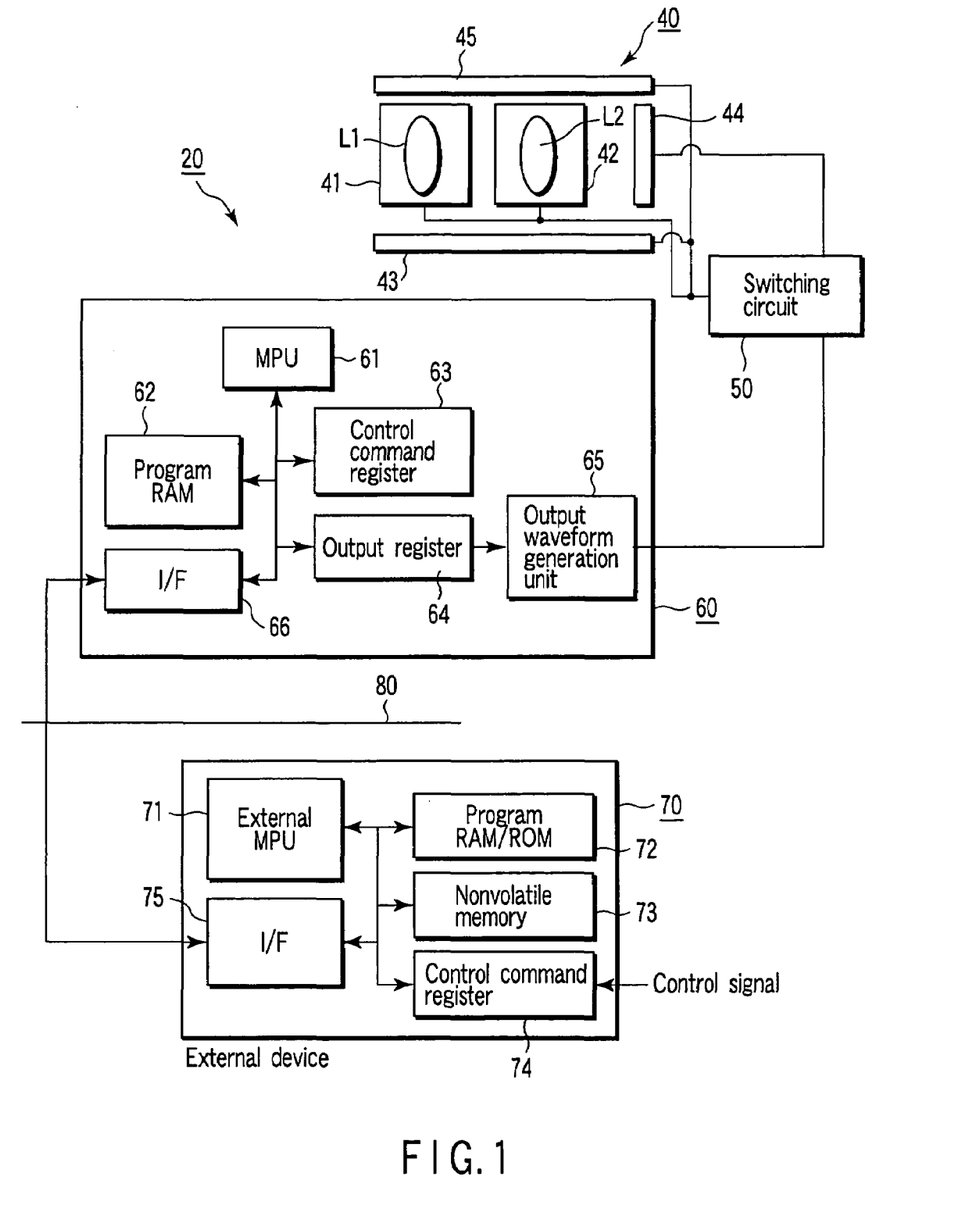
FIG. 1 is an explanatory view showing an actuator system according to a first embodiment of the invention.

FIG. 1 is a block diagram showing an actuator system 20 into which a waveform output device 60 according to a first embodiment of the invention is incorporated.

The actuator system 20 includes an electrostatic actuator 40, a switching circuit 50, the waveform output device 60, an external device 70, and a bus line 80. The switching circuit 50 drives the electrostatic actuator 40. The waveform output device 60 performs control by outputting the waveform data to the switching circuit 50. The external device 70 transmits a waveform pattern generation program P to the waveform output device 60. The waveform output device 60 and the external device 70 are connected to each other through the bus line 80. The actuator system 20 constitutes a camera module which is built in the small electronic devices and the like.

The electrostatic actuator 40 includes a first moving element 41, a second moving element 42, a lower stator 43, an upper stator 45, and an image pickup element 44. The first moving element 41 holds a lens L1, and an electrode surface is formed in the first moving element 41. The second moving element 42 holds a lens L2, and the electrode surface is formed in the second moving element 42. An electrode substrate is provided in the lower stator 43 and the upper stator 45. An image is focused onto the image pickup element 44 through the lenses L1 and L2.

The switching circuit 50 has a function of converting the inputted waveform signal into voltage to provide the voltage to the electrode surface of the first moving element 41, the electrode surface of the second moving element 42, and the electrode substrate of the lower stator 43, and the electrode substrate of the upper stator 45. Namely, 1 and 0 of each bit in the drive pattern correspond to High and Low of the voltage provided to the electrode.

The waveform output device 60 includes MPU (waveform data generation unit) 61, a program RAM 62, a control command register 63, an output register 64, an output waveform generation unit 65, and an I/F module (data reception unit) 66. The waveform pattern generation program P is tentatively stored in the program RAM 62. The output waveform generation unit 65 converts the waveform data into drive data of electromechanical transducer element.

The external device 70 includes an external MPU 71, a program RAM/ROM 72, a nonvolatile memory 73, a control command register 74, and an I/F module (data transmission unit) 75. The external MPU 71 determines a register value or data on the memory to perform the control. The waveform pattern generation program P is stored in the program RAM/ROM 72. The waveform pattern generation program P is stored in the nonvolatile memory 73 such as a flash memory. The control command register 74 performs mapping of the control signal from a user. The I/F module 75 converts the output data into the data in a form of a communication format of a general-purpose bus.

Figure 2:
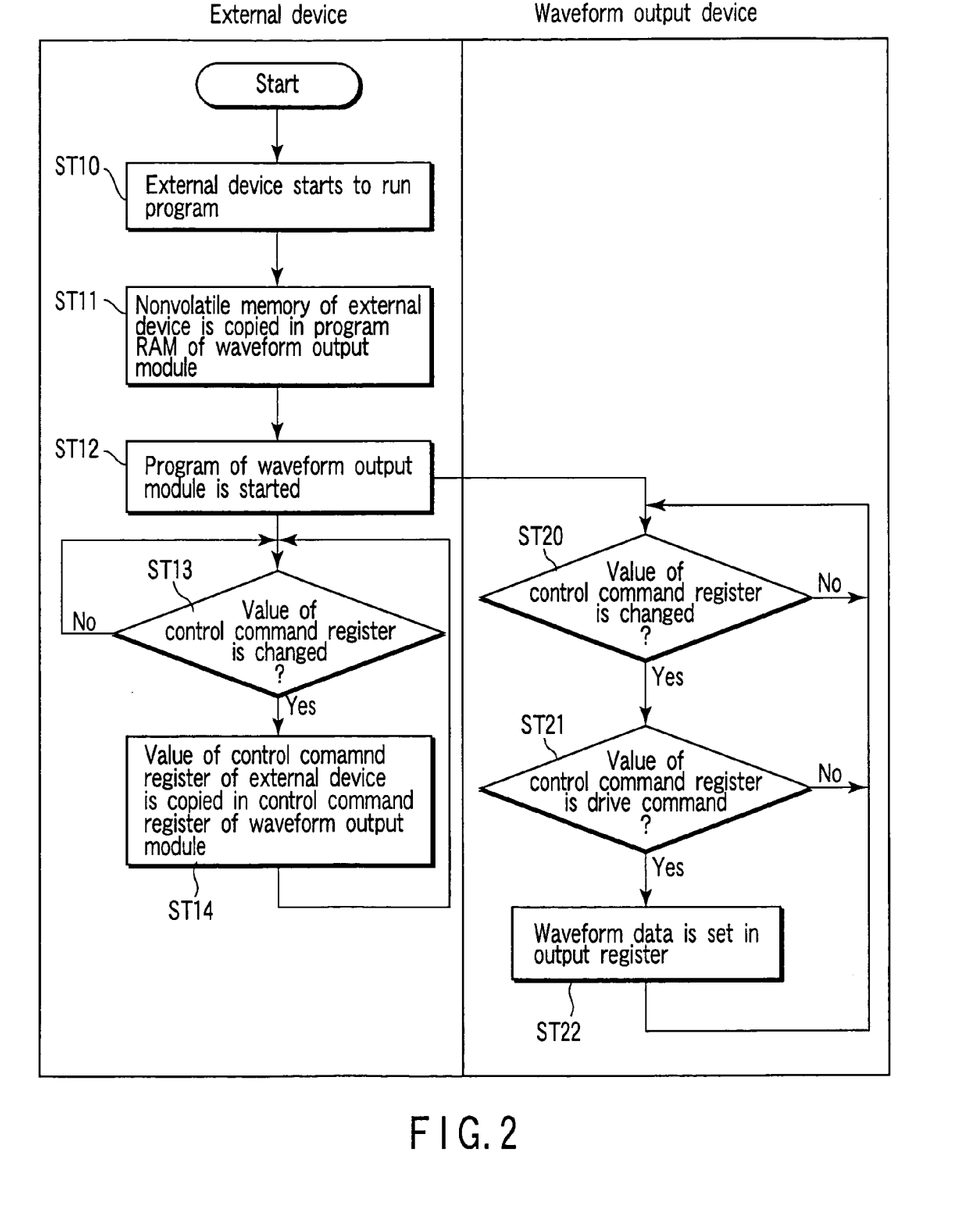
FIG. 2 is an explanatory view showing an operating flow of the actuator system.

The actuator system 20 configured as above is operated according to an operating flow shown in FIG. 2. When the external device 70 is turned on, the external MPU 71 is activated (ST10). The external MPU 71 copies the waveform pattern generation program P stored in the nonvolatile memory 73 in a storage area of the program RAM 62 in the waveform output device 60 through the I/F module 75 (ST11). Then, MPU 61 in the waveform output device 60 is activated to generate the waveform data (output data information and output time information) (ST12).

The waveform pattern generation program P will be described. The waveform pattern generation program P includes a program body (program body to generate waveform pattern) and a monitoring program. In the program body, a computing procedure of generating the waveform pattern is programmed. The monitoring program monitors a control register and data with which the program body generates the waveform pattern. For example, a database in which output data information and output time information of elementary actions of the plural patterns are stored or numerical data for computing the output data information and output time information of the elementary actions can be used as the data with which the program body generates the waveform pattern.

The relationship between the waveform pattern generation program P and the program RAM/ROM 72 and nonvolatile memory 73 will be described in detail. Among the pieces of data used for the generation of the waveform pattern included in the waveform pattern generation program P, the information necessary to respond to an unexpected drive waveform is stored in the nonvolatile memory 73. It is possible that the information which is not necessary to respond to the unexpected drive waveform (data or program used commonly for any waveform) is stored in the nonvolatile memory 73. Alternatively, the information which is not necessary to respond to the unexpected drive waveform may be stored as ROM data in the program RAM/ROM 72. It is possible that the drive waveform data which is primarily utilized by the waveform pattern generation program P is stored in RAM data in the program RAM/ROM 72.

For example, in the case of the database in which the output data information and output time information of elementary actions of the plural patterns are stored, the database is usually stored in the nonvolatile memory 73. In the case of the numerical data for computing the output data information and output time information of the elementary actions, the numerical data itself or variable value of a part of the pieces of numerical data is stored in the nonvolatile memory 73.

The waveform pattern generation program P and the program RAM/ROM 72 and nonvolatile memory 73 can also have the following configuration.

Default data (initial data) of the data used for waveform pattern generation in the waveform pattern generation program P is stored in the ROM area in the program RAM/ROM 72. When a user externally temporarily changes the data used for the waveform pattern generation, the default data is stored in the RAM data in the program RAM/ROM 72. When the user saves the changed data, the user copies the data from the program RAM/ROM 72 to the nonvolatile memory 73. Then, the user defines of which area the waveform pattern generation program P stored in the memory is preferentially utilized. Usually, the program RAM has the first priority, the nonvolatile memory has the second priority, and the program ROM has the third priority.

According to the above rule, when the user does not rewrite the waveform pattern nor exist the data in the nonvolatile memory 73, the default drive waveform is outputted. When the user does not rewrite the waveform pattern and the user saves the waveform data in the nonvolatile memory 73, the waveform pattern generation program P stored in the nonvolatile memory 73 is utilized. When the user rewrites the waveform pattern, the rewritten waveform pattern is outputted.

Thus, the method of storing the information which is not necessary to respond to the unexpected drive waveform in the waveform pattern generation program P is determined by the program configuration, the storage capacities of the program RAM/ROM 72 and nonvolatile memory 73, and the like.

Whether a value of the control command register 74 is changed or not is determined (ST13). When the value of the control command register 74 is changed, the register data of the control command register 74 is transferred to the control command register 65 (ST14). At this point, the data of the control command register 74 is tentatively converted (encoded) into the general-purpose format such as IIC format by the I/F module 75 in the external device 70, the data is converted (decoded) into the register data format again by the I/F module 66 in the waveform output device 60, and the transfer is performed.

On the other hand, the waveform pattern generation program P executed in the waveform output device 60 determines the change of value of the control command register 63 of the waveform output device 60 (ST20), and the program determines whether the value of the control command register 63 is applicable to a drive waveform output command or not (ST21). Then, the waveform data (output data information and output time information) is set in the output register 64 (ST22).

When the waveform data is set in the output register 64, for example, the waveform data is converted into the drive data for the electrostatic actuator 40 by the output waveform generation unit 65 in the following manner. Namely, in the output waveform generation unit 65, digital-to-analog conversion is performed based on the output data information stored in the output register 64, and the waveform signal is formed to output the waveform signal for a drive time corresponding to the output time information.

For example, the waveform signal is formed by a data string of 12 bits, and each bit outputs Low or High voltage. The voltage is about 2.5V in the High state, and the High voltage is sufficiently small relative to the drive voltage of the electrostatic actuator 40. For example, the drive voltage of the electrostatic actuator 40 is 100V. A voltage boost device (not shown) is the device which generates the drive voltage of the electrostatic actuator 40 and is connected to the switching circuit 50. When each bit of the output waveform generation unit 65 is in the High state, the switching circuit 50 outputs the drive voltage. The output of the switching circuit 50 becomes the output to the electrostatic actuator 40.

As described above, according to the actuator system 20, the waveform pattern generation program P is stored in the nonvolatile memory 73 of the external device 70, transferred to the waveform output device 60 as necessary, and then executed. Therefore, it is not necessary to provide the nonvolatile memory on the side of the waveform output device 60, and the production cost can be suppressed. In many cases, the nonvolatile memory is mounted on the external device 70, so that the production cost is not particularly increased.

Figure 3:
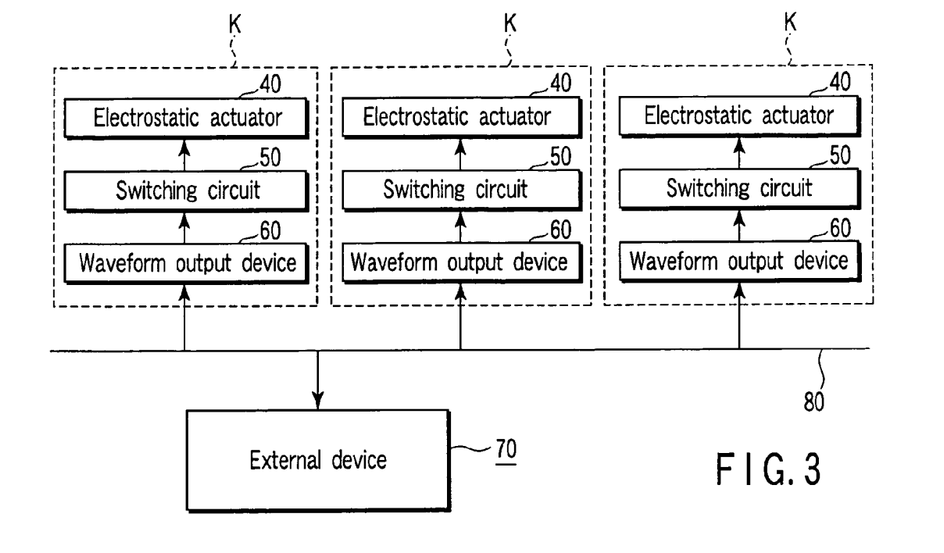
FIG. 3 is an explanatory view showing an application example of the actuator system.

FIG. 3 shows the configuration in which the plural waveform output devices 60 are controlled from one external device 70 to drive the plural electrostatic actuators 40. The waveform output device 60, the switching circuit 50, and the electrostatic actuator 40 are provided in each drive module K. The wiring can be shortened by using the bus line 80. Identification data is set in each drive module K. The external device 70 can transmit the data to an arbitrary drive module by specifying the identification data as a transmitted party. As the identification data of the transmitted party, a slave address can be utilized in the case of, for example, an IIC bus. In the configuration shown in FIG. 3, the production cost of the waveform output device 60 can also be suppressed.

In the embodiment, it has been explained that the waveform pattern generation program P which is copied in the storage area of the program RAM 62 through the I/F module 75 includes the program body for generating the waveform pattern and the monitoring program for monitoring the control register and the data with which the program body generates the waveform pattern. However, the waveform pattern generation program P which is copied in the storage area of the program RAM 62 through the I/F module 75 does not always include all of the program body for generating the waveform pattern and the monitoring program for monitoring the control register and the data with which the program body generates the waveform pattern.

For example, It is possible that a part of the waveform pattern generation program P is copied in the program RAM 62 through the I/F module 75 and another part of the waveform pattern generation program P stored in the ROM area in MPU 61 is copied in the program RAM 62 not through the I/F module 75. It is possible that a part of the waveform pattern generation program P includes a part of the program body for generating the waveform pattern and another part of the waveform pattern generation program P includes the monitoring program for monitoring the control register and the data with which the program body generates the waveform pattern.

In Step ST21, it is also possible that the waveform data set in the output register 64 corresponding to the drive direction are changed by setting drive direction flag data and a drive waveform output command in a control command register value.

Figure 4:
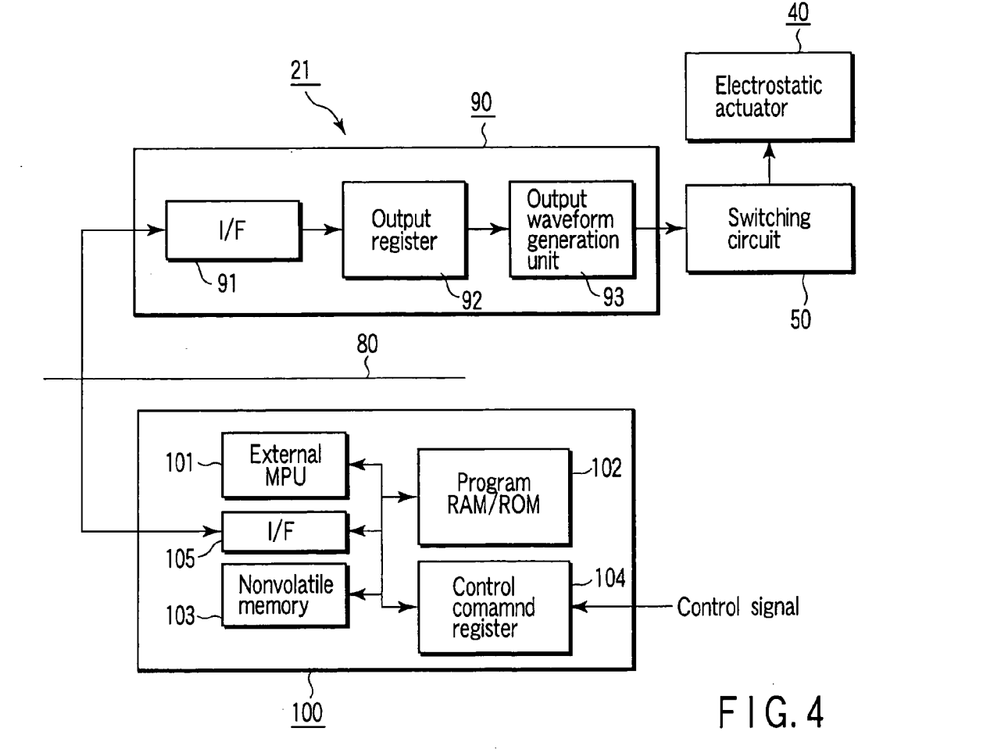
FIG. 4 is an explanatory view showing an actuator system according to a second embodiment of the invention.

FIG. 4 is a block diagram showing an actuator system 21 into which a waveform output device 90 according to a second embodiment of the invention is incorporated. In FIG. 4, the same functional component as FIG. 1 is indicated by the same numeral, and the detail description is not repeated here.

The actuator system 21 includes the electrostatic actuator 40, the switching circuit 50, a waveform output device 90, an external device 100, and the bus line 80. The switching circuit 50 drives the electrostatic actuator 40. The waveform output device 90 performs the control by outputting the waveform data to the switching circuit 50. The external device 100 transmits a waveform pattern generation program P to the waveform output device 90. The waveform output device 90 and the external device 100 are connected to each other through the bus line 80. The actuator system 21 constitutes the camera module which is built in the small electronic devices and the like.

The waveform output device 90 includes an I/F module (data reception unit) 91, an output register 92, and an output waveform generation unit 93. The output waveform generation unit 93 converts the waveform data into drive data of electromechanical transducer element.

The external device 100 includes an external MPU 101, a program RAM/ROM 102, a nonvolatile memory 103, a control command register 104, and an I/F module (data transmission unit) 105. The external MPU 101 determines the register value to perform the control while interpreting and executing the waveform pattern generation program P. The waveform pattern generation program P is stored in the program RAM/ROM 102. The waveform pattern generation program P is stored in the nonvolatile memory 103 such as the flash memory. The control command register 104 performs the mapping of the control signal from the user. The I/F module 105 converts the output data into the data in the form of the communication format of the general-purpose bus.

The input data and the output data between the waveform output device 90 and the external device 100 is converted into the general-purpose bus communication format by the I/F module 105. For example, when the external MPU 101 in the external device 100 outputs the waveform data, the I/F module 105 tentatively converts the register data into the data in the form of the general-purpose communication format, the data is converted into the register data again by the I/F module 91 in the waveform output device 90, and the register data is set in the output register 92. When the waveform data is set in the output register 92, for example, the waveform data is converted into the drive data for the electrostatic actuator 40 by the output waveform generation unit 93 in the following manner. Namely, in the output waveform generation unit 93, the digital-to-analog conversion is performed based on the output data information stored in the output register 92, and the waveform signal is formed to output the waveform signal for a drive time corresponding to the output time information.

For example, the waveform signal is formed by a data string of 12 bits, and each bit outputs the Low or High voltage. The HIGH voltage is about 2.5V, and is sufficiently small relative to the drive voltage of the electrostatic actuator 40. For example, the drive voltage of the electrostatic actuator 40 is 100V.

The voltage boost device (not shown) is the device which generates the drive voltage of the electrostatic actuator 40 and is connected to the switching circuit 50. When each bit of the output waveform generation unit 65 is in a High state, the switching circuit 50 outputs the drive voltage. The output of the switching circuit 50 becomes the output to the electrostatic actuator 40.

Figure 5:
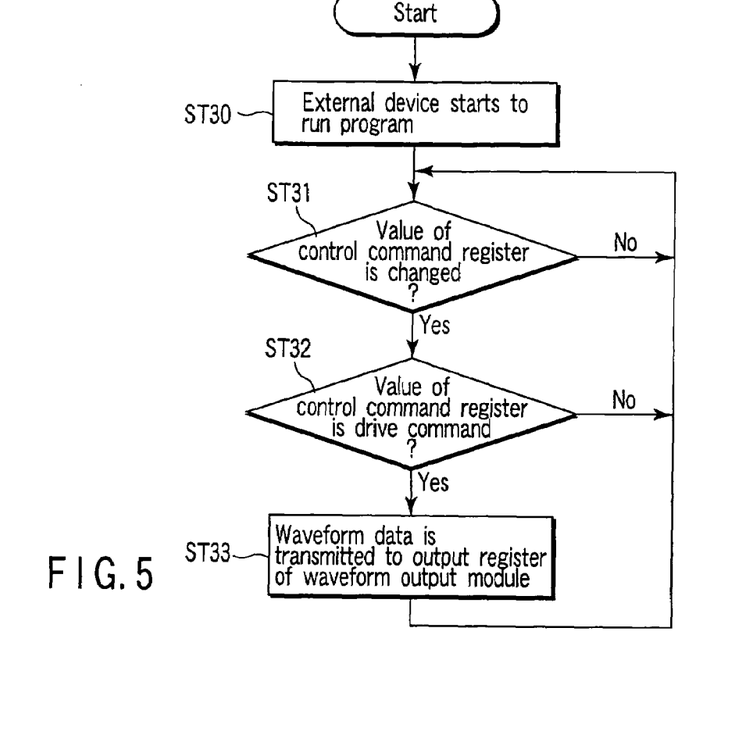
FIG. 5 is an explanatory view showing the operating flow of the actuator system.

The actuator system 21 configured as above is operated according to the operating flow shown in FIG. 5. When the external device 100 is turned on, the waveform pattern generation program P is transferred from the nonvolatile memory 103 to the storage area of the program RAM/ROM 102 in the external device 100. When the transfer is completed, the program of the external device 100 is started to generate the waveform data (ST30). Whether the value of the control command register 104 is changed or not is determined (ST31), and whether the value of the control command register 104 is applicable to the drive waveform output command or not is determined (ST32). Then, the waveform data is set in the output register.

As described above, according to the actuator system 21, the waveform pattern generation program P is stored in the nonvolatile memory 103 of the external device 100, the waveform pattern is transferred to the waveform output device 90 through the bus line 80, and the waveform pattern is outputted. Therefore, it is not necessary to provide the nonvolatile memory on the side of the waveform output device 90, and the production cost can be suppressed. Further, it is not necessary to provide MPU which is the data processing device, so that the configuration can be simplified and the module area can be decreased. In many cases, the data processing device such as the external MPU 101 is incorporated in the external device 100, and the data processing device can be utilized, so that it is not necessary to additionally improve the external device 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A waveform output device comprising:
    a data reception unit which receives at least a part of a waveform pattern generation program transmitted from an external device connected to the data reception unit through a data line, the waveform pattern generation program configured to generate output data information and output time information;
    a tentative storage device which tentatively stores the waveform pattern generation program received from the data reception unit;
    a data processing unit which processes the waveform pattern generation program in the tentative storage device to generate the output data information and the output time information; and
    an output waveform generation unit which outputs waveform data to drive an electronic device based on the output data information and the output time information.

2. A waveform output device according to claim 1, wherein the data line is a bus line.

3. A waveform output device according to claim 1, wherein the data line is an integrated circuit (IC) bus.

4. A waveform output device according to claim 1, wherein the data line is a serial bus in IIC format.

5. A waveform output device according to claim 1, wherein a program body to generate a waveform pattern is included in at least a part of the waveform pattern generation program received by the data reception unit.

6. A waveform output device according to claim 5, wherein data used with which the program body to generate a waveform pattern generates the waveform pattern is further included in at least a part of the waveform pattern generation program received by the data reception unit.

7. A waveform output device comprising:
    a data reception unit which receives at least a part of a waveform pattern generation program transmitted from an external device connected to the data reception unit through a data line, the waveform pattern generation program configured generate output data information and output time information;
    a tentative storage device which tentatively stores the waveform pattern generation program received from the data reception unit;
    a data processing unit which processes the waveform pattern generation program in the tentative storage device to generate the output data information and the output time information; and
    an output waveform generation unit which outputs waveform data to drive an electronic device based on the output data information and the output time information,
    wherein a program body to generate a waveform pattern is included in at least a part of the waveform pattern generation program received by the data reception unit, and
    a monitoring program to monitor a control register is further included in at least a part of the waveform pattern generation program received by the data reception unit.

8. A drive device comprising:
    a data reception unit which receives at least a part of a waveform pattern generation program transmitted from an external device connected to the data reception unit through a data line, the waveform pattern generation program configured to generate output data information and output time information;

a tentative storage device which tentatively stores the waveform pattern generation program received from the data reception unit;

a data processing unit which processes the waveform pattern generation program in the tentative storage device to generate the output data information and the output time information;

an output waveform generation unit which outputs waveform data to drive an electronic device based on the output data information and the output time information; and the electronic device which is connected to the output waveform generation unit through the data line, the electronic device being driven by the waveform data.

9. A drive device according to claim 8, wherein the data line is a bus line.

10. A drive device according to claim 8, wherein the data line is an integrated circuit (IC) bus.

11. A drive device according to claim 8, wherein the data line is a serial bus in IIC format.

12. A drive device according to claim 8, wherein a program body to generate a waveform pattern is included in at least a part of the waveform pattern generation program received by the data reception unit.

13. A drive device according to claim 12, wherein data used with which the program body to generate a waveform pattern generates the waveform pattern is further included in at least a part of the waveform pattern generation program received by the data reception unit.

14. A drive device comprising:

a data reception unit which receives at least a part of a waveform pattern generation program transmitted from an external device connected to the data reception unit through a data line, the waveform pattern generation program configured to generate output data information and output time information;

a tentative storage device which tentatively stores the waveform pattern generation program received from the data reception unit;

a data processing unit which processes the waveform pattern generation program in the tentative storage device to generate the output data information and the output time information;

an output waveform generation unit which outputs waveform data to drive an electronic device based on the output data information and the output time information; and the electronic device which is connected to the output waveform generation unit through the data line, the electronic device being driven by the waveform data, wherein a program body to generate a waveform pattern is included in at least a part of the waveform pattern generation program received by the data reception unit, and a monitoring program to monitor a control register is further included in at least a part of the waveform pattern generation program received by the data reception unit.

* * * * *